United States Patent
Tochigi

(10) Patent No.: US 6,195,210 B1
(45) Date of Patent: Feb. 27, 2001

(54) IMAGE PICKUP LENS SYSTEM AND CAMERA EQUIPPED WITH THE SAME

(75) Inventor: Akiyoshi Tochigi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/357,133

(22) Filed: Jul. 20, 1999

(30) Foreign Application Priority Data

Jul. 21, 1998 (JP) .................................................. 10-219911

(51) Int. Cl.$^7$ .................................................. G02B 15/14
(52) U.S. Cl. ............................................. 359/692; 359/683
(58) Field of Search .................................. 359/692, 690, 359/687–688, 683, 676

(56) References Cited

U.S. PATENT DOCUMENTS

| | | | |
|---|---|---|---|
| 5,315,440 | 5/1994 | Betensky | 359/692 |
| 5,386,321 | 1/1995 | Kawamura | 359/692 |
| 5,786,945 | 7/1998 | Aoki et al. | 359/692 |

FOREIGN PATENT DOCUMENTS

| | | |
|---|---|---|
| 2-18511 | 1/1990 | (JP) . |
| 5-113537 | 5/1993 | (JP) . |
| 5-224122 | 9/1993 | (JP) . |
| 6-331889 | 12/1994 | (JP) . |
| 7-253540 | 10/1995 | (JP) . |
| 8-334693 | 12/1996 | (JP) . |

*Primary Examiner*—Georgia Epps
*Assistant Examiner*—Jordan M. Schwartz
(74) *Attorney, Agent, or Firm*—Pillsbury Winthrop LLP

(57) ABSTRACT

An image pickup lens system which comprises a first positive lens unit and a second negative lens unit in order from the object side, and is configured to change a magnification by varying an airspace reserved between the first lens unit and the second lens unit, wherein the first lens unit comprises, in order from the object side, a plastic lens element having a weak refractive power, a negative glass lens element and a positive glass lens element, and wherein the second lens unit comprises, in order form the object side, a plastic lens element having a weak refractive power and a plastic lens element having a negative refractive power; the lens system is compact and light in weight, has performance which is varied little by changes in temperature and humidity, and can be manufactured at a low cost. Furthermore, a compact camera which is equipped with the image pickup lens system.

28 Claims, 8 Drawing Sheets

IMAGE PICKUP LENS SYSTEM AND CAMERA EQUIPPED WITH THE SAME

BACKGROUND OF THE INVENTION

1. Field of the Invention

The present invention relates to a compact and light-weight lens system which can be manufactured at a low cost and has high performance, and more specifically an image pickup lens system which is suited for use in lens shutter cameras and a camera which uses the image pickup lens system.

2. Description of the Prior Art

A zoom lens system which consists, in order from the object side, of a first lens unit having a positive refractive power and a second lens unit having a negative refractive power is conventionally known as a compact image pickup lens system such as a compact zoom lens system which can be manufactured at a low cost.

Lens systems disclosed by Japanese Patents Kokai Publication No. Hei 2-18511, No. Hei 5-224122, No. Hei 6-331899, No. Hei 7-253540 and No. Hei 8-334693 are known as conventional examples of image pickup lens system (zoom lens system) which has the composition described above.

Each of these conventional examples uses a first lens unit which is composed of three lens elements and a second lens unit which is composed of two lens elements, or each of the zoom lens systems consists as a whole of five lens elements. Four or all of the five lens elements are made of plastic materials to manufacture the zoom lens system at a low cost.

A lens system disclosed by Japanese Patent Kokai Publication No. Hei 5-113537 is also known as another conventional example. This conventional example also consists of five lens elements, and uses a plastic lens element having a relatively weak refractive power in a first lens unit and another plastic lens element in a second lens unit so that the lens system can be manufactured at a low cost while restricting focal lengths of the plastic lens elements and so on so as to reduce variations of imaging performance which are to be caused due to changes in environmental conditions such as temperature and humidity.

When plastic lens elements which have sufficiently strong refractive powers are used in a large number in a lens system as in the lens systems disclosed by Japanese Patent Kokai Publication No. Hei 2-18511, No. Hei 5-224122, No. Hei 6-331889, No. Hei 7-253540 or No. Hei 8-334693, the lens system has a defect that it allows its imaging performance to be varied due to changes of environmental conditions such as temperature and humidity. When the imaging performance is varied due to a humidity change in particular, a long time is required until the performance is stabilized, thereby making is difficult to preestimate how the imaging performance, for example an imaging location, will be changed and to correct a change of the imaging location by moving the lens elements. Imaging performance is remarkably degraded when plastic lens elements having sufficiently strong refractive powers are used in a large number as described above.

Furthermore, the lens system disclosed by Japanese Patent Kokai Publication No. Hei 5-113517 which uses only the two plastic lens elements out of the five lens elements cannot be manufactured at a sufficiently low cost.

Furthermore, the lens system disclosed by Japanese Patent Kokai Publication No. Hei 5-224122 uses a cemented plastic lens component in the first lens unit. However, a cemented plastic lens component which consists of two different kinds of plastic lens elements can hardly maintain a stable cemented condition since the plastic lens elements have high coefficients of expansion.

SUMMARY OF THE INVENTION

A primary object of the present invention is to provide a compact and light-weight image pickup lens system which has favorable imaging performance to be varied little due to temperature changes or humidity changes and can be manufactured at a low cost as well as a camera which uses the image pickup lens system.

The image pickup lens system according to the present invention is a lens system characterized in that it comprises, in order from the object side, a first lens unit having a positive refractive power and a second lens unit having a negative refractive power, that the lens system is configured to change a magnification by varying an airspace reserved between the first lens unit and the second lens unit, that the first lens unit comprises, in order from the object side, a plastic lens element having a weak refractive power, a glass lens element having a negative refractive power and a glass lens element having a positive refractive power, and that the second lens unit comprises, in order from the object side, a plastic lens element having a weak refractive power and a plastic lens element having a negative refractive power.

Furthermore, the image pickup lens system according to the present invention which has a second composition is characterized in that it comprises at least a cemented lens component which is made of different glass materials and at least a lens element and that all cemented lens components are made of glass materials and lens elements are made of plastic materials.

DETAILED DESCRIPTION OF THE PREFERRED EMBODIMENTS

Figure 1:
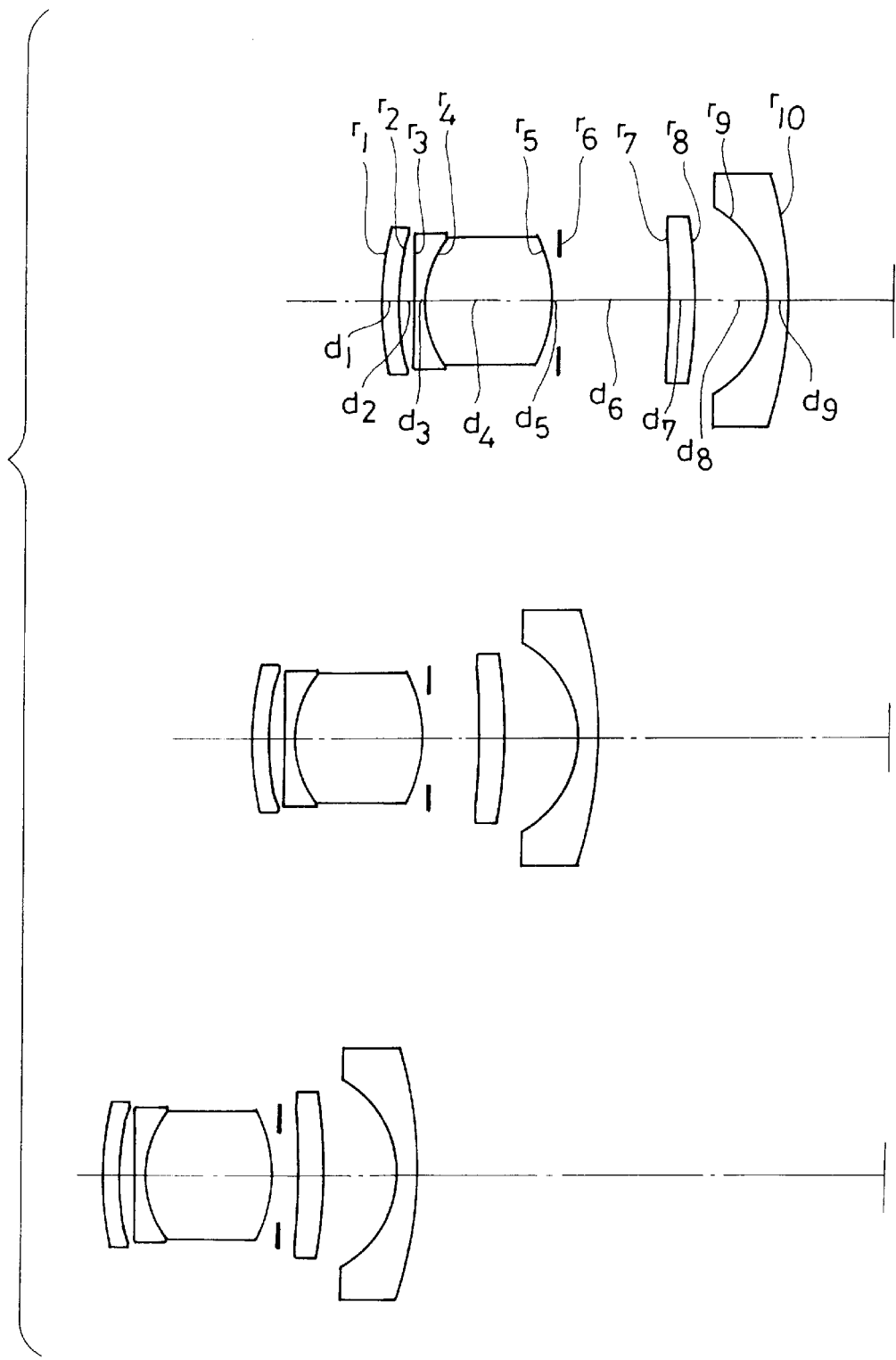
FIGS. 1 through 7 are sectional views illustrating compositions of first through seventh embodiments respectively of the image pickup lens system according to the present invention.
Figure 2:
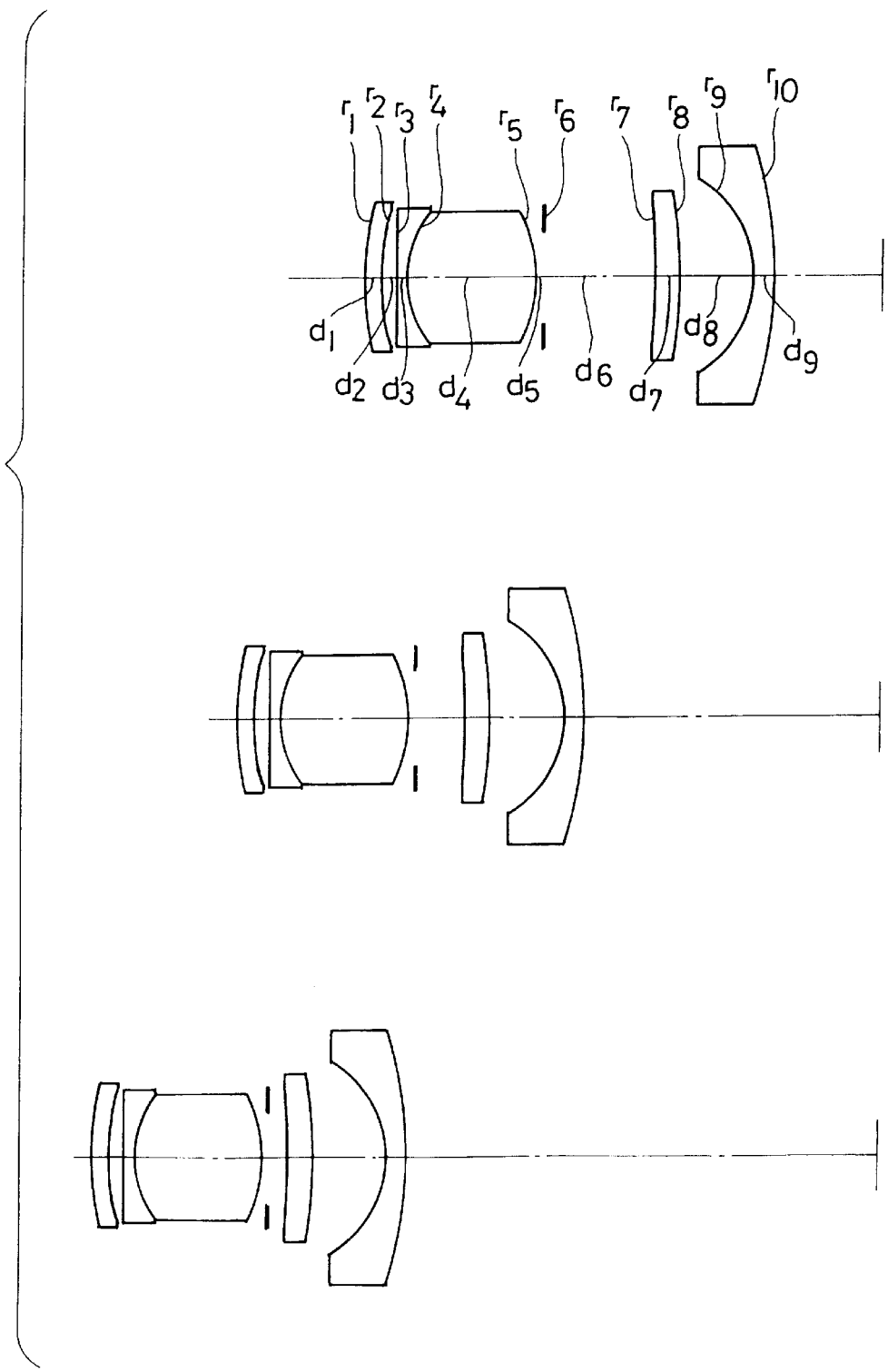
Figure 3:
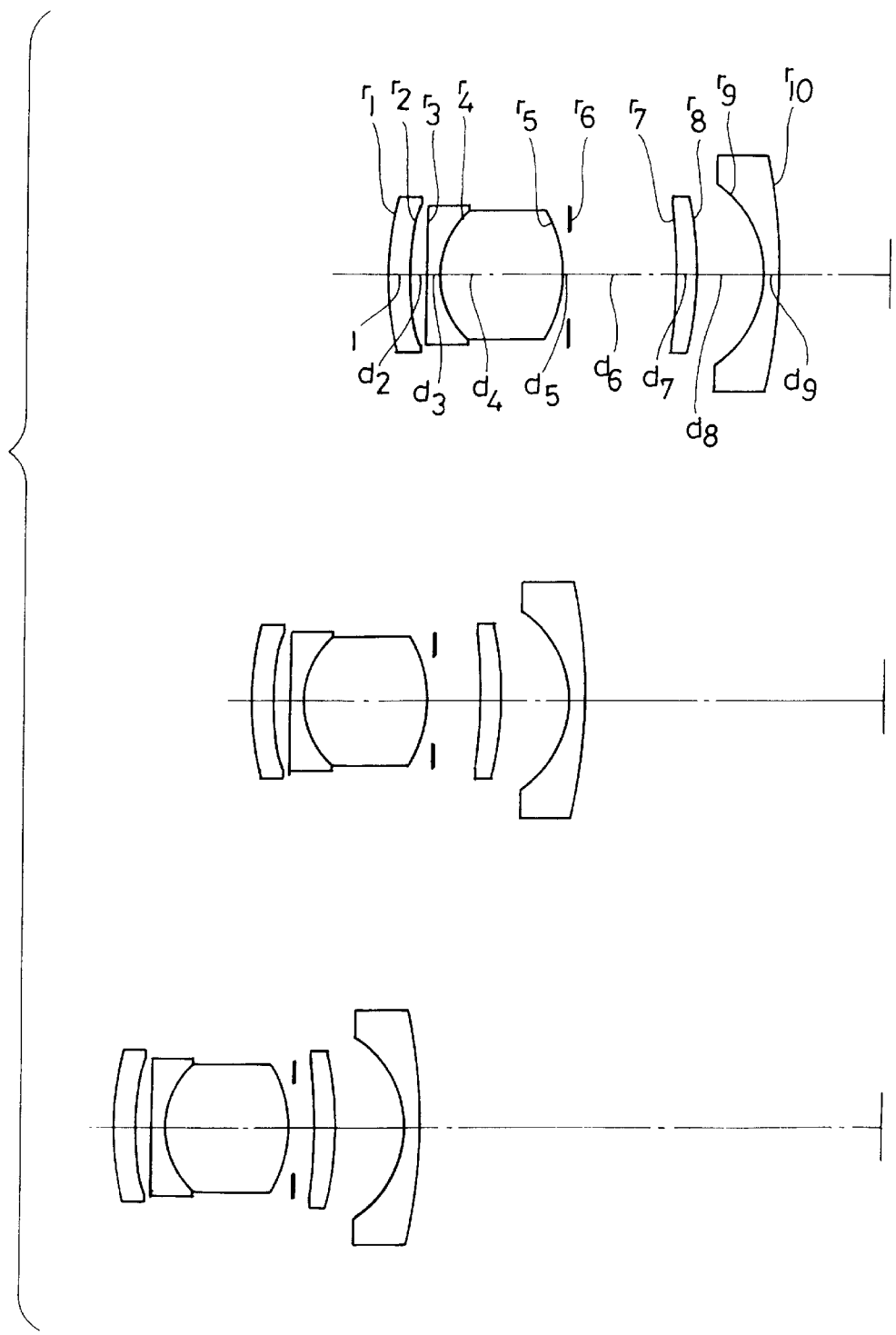
Figure 4:
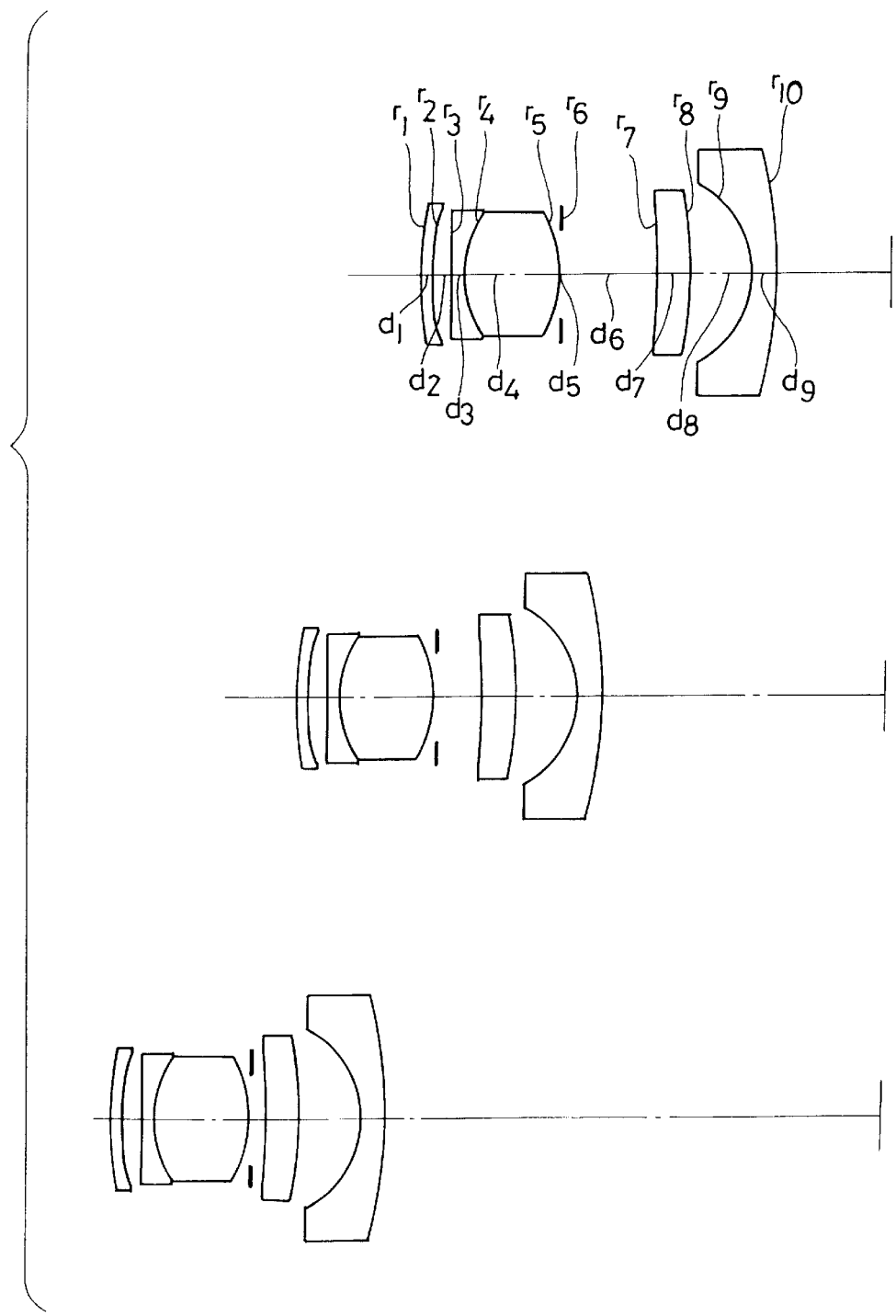
Figure 5:
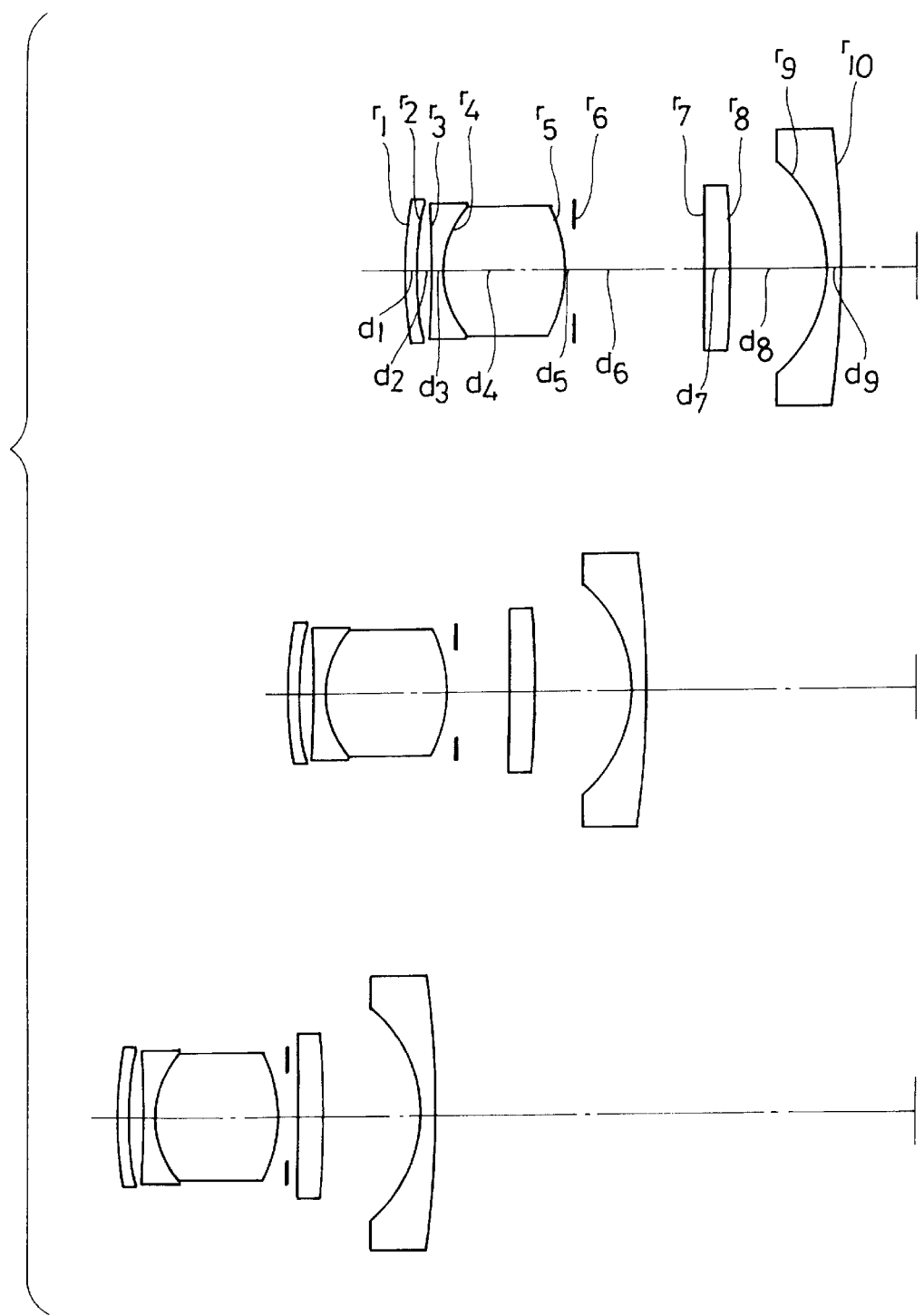
Figure 6:
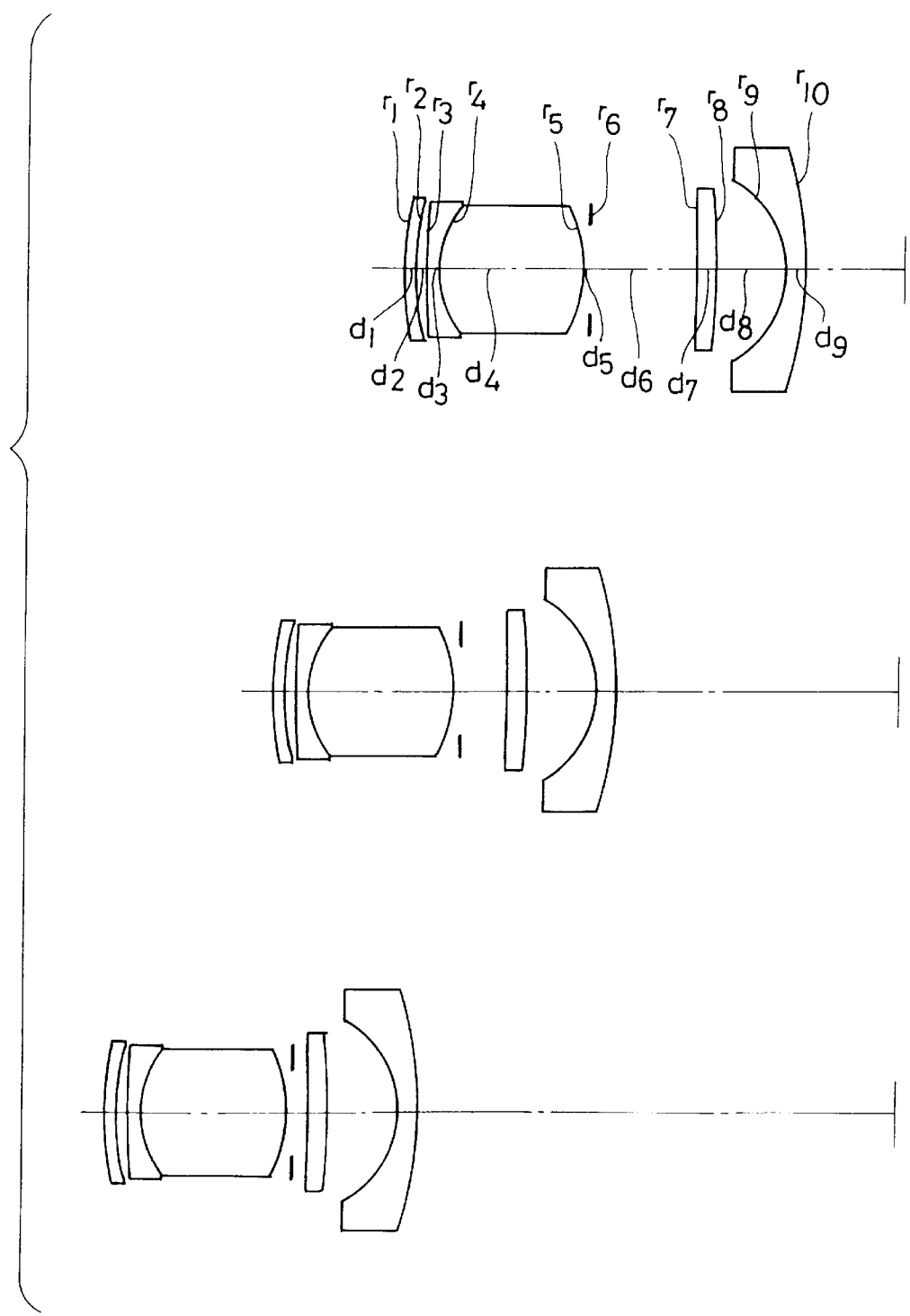
Figure 7:
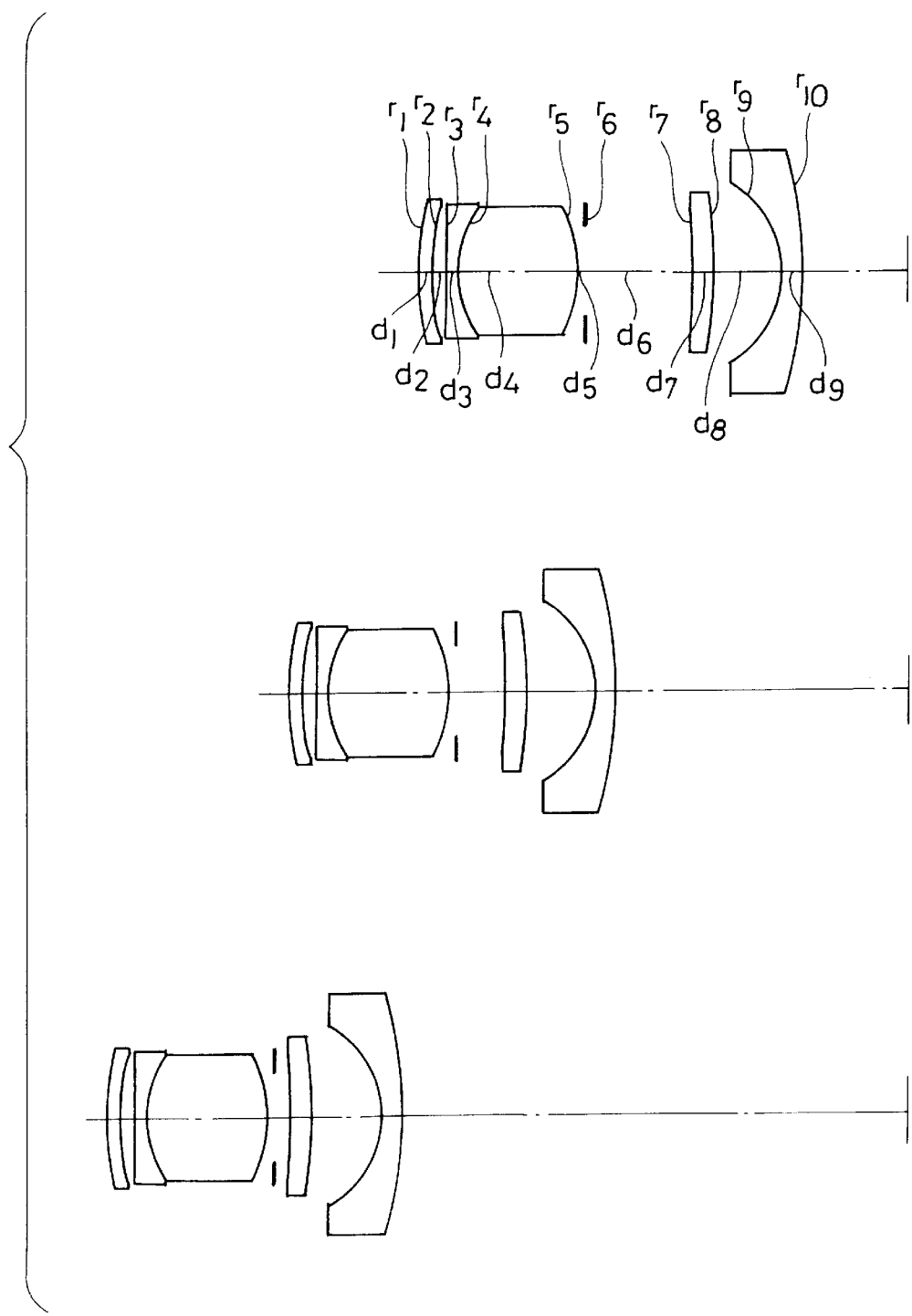

The image pickup lens system according to the present invention is characterized in that it comprises, in order from the object side, a first lens unit having a positive refractive power and a second lens unit having a negative refractive power, that the lens system is configured to change a magnification by varying an airspace reserved between the first lens unit and the second lens unit, that the first lens unit comprises, in order from the object side, a plastic lens element having a weak refractive power, a glass lens element having a negative refractive power and a glass lens element having a positive refractive power, and that the second lens unit comprises, in order from the object side, a plastic lens element having a weak refractive power and a plastic lens element having a negative refractive power.

A total length of a lens system, i.e., a distance as measured from an object side surface to an image side surface of the lens system, can be shortened by composing the lens system of a first lens having a positive refractive power and a second lens unit having a negative refractive power. Furthermore, the lens system according to the present invention can be manufactured at a low cost since it uses the three plastic lens elements.

In a lens system (zoom lens system) which has the composition described above and a short total length, a lens element which is disposed on the image side in the second lens unit generally has a large diameter.

The lens system according to the present invention can be manufactured at a low cost owing to a fact that a lens element which has a large diameter and is to be disposed on the image side in the second lens unit is made of a plastic material. Simultaneously, this plastic lens element provides a remarkable effect to reduce a weight of the lens system. In case of a vari-focal lens system in particular, the reduction of a weight results in an additional effect to lower power consumption by a motor which drives the lens system for changing a magnification.

When a plastic lens which has a sufficiently strong refractive power is used in the first lens unit, a variation of imaging performance which is caused due to a temperature or humidity change is magnified by the second lens unit. When a plastic lens element which has a sufficiently strong refractive power is used on the object side in the second lens unit, a variation of imaging performance caused due to a temperature or humidity change is similarly magnified by the lens element disposed on the image side in the second lens unit.

The image pickup lens system according to the present invention is configured to assign a vari-focal function to the negative plastic lens element which is disposed in the second lens unit and has a sufficiently strong refractive power. The negative plastic lens element which has the sufficiently strong refractive power is disposed at a location which is nearest an image surface, thereby being capable of reducing a variation of imaging performance caused due to a temperature or humidity change. Furthermore, aberrations are effectively corrected by using the negative glass lens element and the positive glass lens element in the first lens unit. Aberrations which cannot be corrected even with the glass lens elements are corrected with plastic lens elements having weak refractive powers which are used in the first lens unit and the second lens unit. Since these plastic lens elements have the weak refractive powers, these lens elements caused little variation of imaging performance due to a temperature or humidity change.

The image pickup lens system according to the present invention which consists of the first lens unit and the second lens unit as described above can comprise an additional lens unit which is disposed on the object side of the first lens unit or the image side of the second lens unit. Though a lens system which can accomplish the object of the present invention and exhibit its function or effect is obtainable even when such an additional lens unit is used, it is most desirable for simplification of a composition to compose the lens system of the first lens unit and the second lens unit described above.

It is desirable to configure the negative glass lens element to be disposed in the first lens unit so as to have a radius of curvature on an image side surface which is smaller in absolute value than that on an object side surface since such a lens element can correct spherical aberration and coma produced by the positive glass lens element disposed in the first lens unit.

Furthermore, it is preferable to configure the plastic lens element having the weak refractive power which is to be disposed in the first lens unit so as to have a convex surface on the object side and an aspherical surface since such a plastic lens element is capable of correcting spherical aberration, coma and astigmatism produced by the glass lens elements disposed in the first lens unit, and reducing positive distortion produced by the negative plastic lens element disposed in the second lens unit. Furthermore, it is desirable to configure this aspherical surface so as to have a positive refractive power which is weakened as portions of the aspherical surface are farther from an optical axis.

In order to sufficiently correct longitudinal chromatic aberration in the lens system according to the present invention which has the composition described above, it is preferable to cement the negative glass lens element to the positive glass lens element in the first lens unit so as to compose a cemented lens component. Furthermore, this cemented lens component is capable of reducing production of spherical aberration and coma of high orders. By cementing the lens elements as described above, it is possible to prevent performance of the lens system from being degraded due to eccentricities of the lens elements.

It is preferable for the lens system according to the present invention to dispose an aperture stop on the image side of the positive glass lens element of the first lens unit which consists of the plastic lens element having the weak refractive power, the negative glass lens element and the positive glass lens element. That is, it is desirable to dispose an aperture stop on the image side of the first lens unit.

By disposing an aperture stop on the image side of the positive glass lens element of the first lens unit, a distance as measured from an exit pupil to an image surface can be shorter than that in a case where the aperture stop is disposed on the object side of the positive glass lens element and the negative plastic lens element to be disposed in the second lens unit can have a smaller diameter, whereby the plastic lens element can be easily molded in an accurate shape to stabilize performance of the lens system. The location of the aperture stop on the image side of the first lens unit is preferable also to simplify a structure of a mechanism which is to be adopted to move some or all of the lens elements along an optical axis for focusing dependently on a distance from a camera to an object. In other words, the aperture stop which is disposed on the image side of the first lens unit can be moved together with the first lens unit for focusing while fixing an airspace reserved between the first lens unit and the aperture stop, thereby making it possible to simplify the structure of the mechanism and electrical wiring as described above. The simplification of the structure of the mechanism and the electrical wiring makes it possible to configure a camera more compact.

Furthermore, it is preferable to select a polyolefin resin as a material for the negative plastic lens element to be used in the second lens unit.

As compared with a lens element which is made of a polycarbonate resin or a polymethyl methacrylate resin (PMMA), a lens element which is made of a polyolefin resin is capable of reducing a variation of imaging performance to be caused due to a humidity change.

For a similar reason, it is desirable to select a polyolefin resin as a material also for the plastic lens element having the weak refractive power which is to be disposed in the second lens unit.

The plastic lens element having the weak refractive power which is used in the first lens unit may be injured since it is disposed on the object side in the lens system. It is therefore desirable to select a polymethyl methacrylate resin which has high hardness as a material for this plastic lens element. Alternately, a cover glass plate may be disposed on the object side of the first lens unit so that a material which is so hard in particular may not be used for the plastic lens element having the weak refractive power which is to be disposed in the first lens unit.

When the image pickup lens system according to the present invention comprises means (such as a film or CCD), for example a rectangular field stop, which defines lengths in directions along a long side and a short side of an image pickup surface as an image pickup range in the vicinity of an image surface formed by the image pickup lens system, it is preferable to configure the plastic lens element to be disposed in the second lens unit of the image pickup lens system so as to have an external shape which is long in the direction along the long side of the image pickup surface and short in the direction along the shorter side of the image pickup surface.

Figure 8:
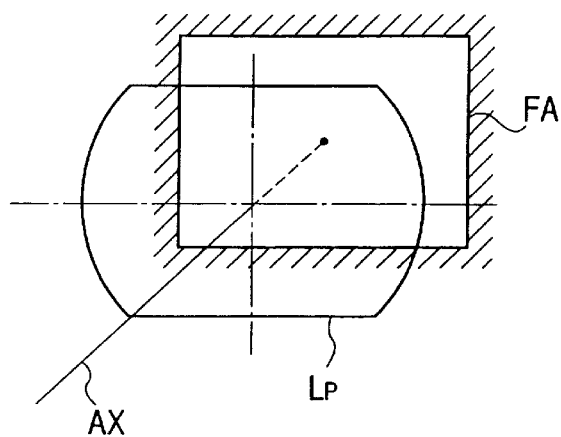
FIG. 8 is a diagram showing a condition wherein a lens component which is long in a direction along a longer side of an image pickup surface and short in a direction along a shorter side of the image pickup surface is disposed in combination with a rectangular field stop.

Since an image pickup surface of a film or the like is generally rectangular, an effective light bundle to attain to the image pickup surface has a sectional shape which is not circular but nearly rectangular within a region where it passes through lens elements disposed apart from a stop. Accordingly, portions of the lens elements other than those which allow transmission of the effective light bundle may be omitted. FIG. 8 shows a plastic lens element L from which upper and lower unnecessary portions are cut off and a rectangular field stop FS which is disposed on the image side of the plastic lens element L. A reference symbol AX represents an optical axis. Upper and lower portions of a lens element can be cut off as shown in FIG. 8 so that parts other than a lens element can be disposed in spaces thus formed, thereby configuring a camera more compact. Simultaneously, a lens system can also be made more compact and lighter in weight by cutting off the portions. When metal dies are prepared so as to mold plastic lens elements in such a shape as that shown in FIG. 8, for example, it is possible to manufacture plastic lens elements only by a shaping work without a cutting step, thereby lowering a manufacturing cost of lens systems though it is necessary for manufacturing glass lens element having such a shape to cut off unnecessary portions after polishing the lens elements which have a circular external shape.

It is desirable that the lens system according to the present invention satisfies the following condition (1):

$$0.5 < f_1/f_w < 0.9 \tag{1}$$

wherein the reference symbol $f_1$ represents a focal length of the first lens unit and the reference symbol $f_w$ designates a focal length of the lens system as a whole at its wide position.

The condition (1) is required to impart an adequate refractive power to the first lens unit. If the lower limit of 0.5 of the condition (1) is exceeded, the lens units will be moved for long distances to change a magnification, thereby making it difficult to configure the lens system compact. If the upper limit of 0.9 of the condition (1) is exceeded, in contrast, the first lens unit will have too strong a refractive power and produce large amounts of aberrations which can hardly be corrected.

It is more desirable to satisfy, in place of the condition (1), the following condition (1—1):

$$0.65 < f_1/f_w < 0.75 \tag{1—1}$$

Furthermore it is desirable that the lens system according to the present invention satisfies the following condition (2):

$$-0.9 < f_2/f_w < -0.5 \tag{2}$$

wherein the reference symbol $f_2$ represents a focal length of the second lens unit.

The condition (2) is required to impart an adequate refractive power to the second lens unit. If the upper limit of −0.5 of the condition (2) is exceeded, the lens units will be moved for long distances to change a magnification, thereby undesirably prolonging a total length of the lens system. If the lower limit of −0.9 of the condition (2) is exceeded, in contrast, the second lens unit will have too strong a refractive power, thereby making it difficult to correct aberrations.

It is more desirable to satisfy, in place of the condition (2), the following condition (2—1):

$$-0.75 < f_2/f_w < -0.65 \tag{2—1}$$

It is desirable that the lens system according to the present invention satisfies the following condition (3):

$$0.15 < d_4/f_w < 0.45 \tag{3}$$

wherein the reference symbol $d_4$ represents thickness of the positive glass lens element disposed in the first lens unit.

The condition (3) defines thickness of the positive glass lens element disposed in the first lens unit. If the upper limit of 0.45 of the condition (3) is exceeded or if the lower limit of 0.15 of the condition (3) is exceeded, it will be difficult to balance spherical aberration with astigmatism in the lens system.

It is more desirable to satisfy, in place of the condition (3), the following condition (3—1):

$$0.25 < d_4/f_w < 0.35 \tag{3—1}$$

The image pickup lens system according to the present invention may have a second composition which is described below:

The lens system according to the present invention which has the second composition is characterized in that it comprises a pair of cemented lens components composed of lens elements which are different at least in glass materials thereof and at least a lens element, that all the lens elements of the cemented lens components are made of the glass materials and that all lens elements are made of plastic materials.

To obtain a lens system which has favorable imaging performance and a simple composition, it is effective to use cemented lens components each composed of lens elements which are made of different glass materials. In other words, chromatic aberration can be corrected by utilizing a difference in optical characteristics between two glass materials which are different mainly in Abbe's numbers thereof. Furthermore, a cemented lens component is capable of suppressing production of aberrations of high orders which are liable to be produced by an air lens formed between two lens elements apart from each other. Furthermore, a cemented lens component is capable of reducing causes for performance degradation at a manufacturing stage such as an error in an airspace between the lens elements apart from each other.

Furthermore, it is possible to produce aberrations of high orders which are effective to correct aberrations by utilizing a difference in the optical characteristics between two glass materials which are different mainly in refractive indices and enhance imaging performance of an optical system with the aberrations of high orders.

Furthermore, a cemented lens component has a merit that it can easily be sustained with a lens barrel.

In order to lower a manufacturing cost of a lens system and reduce its weight, on the other hand, it is advantageous to make lens elements of plastic materials. When plastic lens elements which are made of different materials are cemented to each other or when a lens element made of a plastic material is cemented to a lens element made of a glass material, however, it is difficult to maintain a stable cemented condition since the lens elements are expanded remarkably differently due to a temperature change or a humidity change.

The lens system according to the present invention which has the second composition is characterized in that the cemented lens components are made only of glass materials and that the plastic lens elements are made only of plastic materials, thereby being configured to balance imaging performance with a manufacturing cost thereof.

For a zoom lens system in particular, it is required to correct chromatic aberration in each lens unit. To meet this requirement, it is more effective to compose the lens system according to the present invention as described above. For a zoom lens system in which aberrations are magnified by a final lens unit as seen from the object side toward an image surface, it is desirable to use cemented lens components made of glass materials in a lens unit which is disposed on the object side of the final lens unit.

It is desirable that the lens system according to the present invention having the second composition is configured as a lens system which is described below:

The lens system is characterized in that it comprises, in order from the object side, a first lens unit having a positive refractive power and a second lens unit having a negative refractive power, that the lens system changes a magnification by varying an airspace reserved between the first lens unit and the second lens unit, that the first lens unit is composed of a plastic lens element and a cemented lens component consisting of two glass lens elements, and that the second lens unit is composed of two plastic lens elements.

A lens system which comprises a first lens unit having a positive refractive power and a second lens unit having a negative refractive power like the lens system according to the present invention can have a short total length. Furthermore, a manufacturing cost of such a lens system can be lowered by using three plastic lens elements.

In a zoom lens system which has a short total length, a lens element disposed on the image side in a second lens unit generally has a large diameter. Since the lens element having the large diameter is made of a plastic material, it is effective not only to lower a manufacturing cost of the lens system but also to reduce a weight of the lens system and serves to reduce a power consumption by a motor which is used to move lens elements to change a magnification.

The zoom lens system described above uses a cemented lens component in a first lens unit and is preferable to correct aberrations favorably. Though it is desirable for reduction of a manufacturing cost to compose the cemented lens component of plastic lens elements, plastic lens elements have high coefficients of expansion and can hardly by maintained in a stable cemented condition as described above.

The lens system according to the present invention which uses the cemented lens components made of glass materials is free from the defect described above and allows glass materials to be selected within a broad range, thereby being advantageous from a viewpoint of correction of aberrations.

It is desirable that the lens element having a weak refractive power which is to be used in the lens system according to the present invention has a refractive power within a range defined by the following condition (4):

$$|f_s/f_w|>5 \qquad (4)$$

wherein the reference symbol $f_s$ represents a focal length of the lens element having the weak refractive power.

It is more desirable to satisfy, in place of the condition (4), the following condition (4—1).

$$|f_s/f_w|>12.5 \qquad (4\text{—}1)$$

It is desirable that the lens element having the weak refractive power in the first lens unit of the lens system according to the present invention satisfies the following condition (5):

$$|f_s(1)/f_1|>6.5 \qquad (5)$$

wherein the reference symbol $f_s(1)$ represents a focal length of the lens element having the weak refractive power.

It is more desirable to satisfy, in place of the condition (5), the following condition (5—1):

$$|f_s(1)/f_1|>16.5 \qquad (5\text{—}1)$$

It is much more desirable to satisfy, in place of the condition (5) or (5—1), the following condition (5—2):

$$|f_s(1)/f_1|>22.5 \qquad (5\text{—}2)$$

Furthermore, it is desirable that the lens element having the weak refractive power in the second lens unit satisfies the following condition (6):

$$|f_s(2)/f_2|>6.5 \qquad (6)$$

wherein the reference symbol $f_s(2)$ represents a focal length of the lens element having the weak refractive power.

It is more desirable to satisfy, in place of the condition (6), the following condition (6—1):

$$|f_s(2)/f_2|>16.5 \qquad (6\text{—}1)$$

It is much more desirable to satisfy, in place of the condition (6) or (6—1), the following condition (6—2):

$$|f_s(2)/f_2|>22.5 \qquad (6\text{—}2)$$

Furthermore, it is desirable that the positive glass lens element disposed in the first lens unit has thickness $d_4$ which satisfies the following condition (7):

$$0.21<d_4/f_1<0.63 \qquad (7)$$

If the upper limit or the lower limit of the condition (7) is exceeded, it will be difficult to balance spherical aberration with astigmatism.

It is more desirable to satisfy, in place of the condition (7), the following condition (7—1):

$$0.38<d_4/f_1<0.50 \qquad (7\text{—}1)$$

In addition, the lens system according to the present invention is based on a vari-focal lens system which comprises, in order from the object side, a first lens unit having a positive refractive power and a second lens unit having a negative refractive power. It is therefore desirable to compose the lens system of two lens units when compactness of the lens system is preferred. When it is desired to configure the lens system so as to have a high vari-focal ratio, however, each of the lens units has a strong power, thereby making it difficult to suppress variations of aberrations which are to be caused by varying the airspace reserved between the first lens unit and the second lens unit. When a high vari-focal ratio and a favorable aberration correcting function are preferred, a subunit having a refractive power which is not so high as that of a vari-focal lens unit but is similar to that of a lens element having substantially no power (powerless lens element) may be disposed in the first lens unit or the second lens unit and aberrations may be corrected by moving this subunit during a change of a magnification.

Now, the preferred embodiments of the image pickup lens system according to the present invention will be described in a form of numerical data:

Embodiment 1
f = 39.188~56.886~73.621, F number = 4.66~6.76~8.75

$r_1 = 30.899$
$\quad d_1 = 1.59 \quad n_1 = 1.49241 \quad \nu_1 = 57.66$
$r_2 = 32.414$ (aspherical surface)
$\quad d_2 = 1.33$
$r_3 = 298.073$
$\quad d_3 = 1.09 \quad n_2 = 1.58144 \quad \nu_2 = 40.75$
$r_4 = 9.773$
$\quad d_4 = 12.16 \quad n_3 = 1.51823 \quad \nu_3 = 58.90$
$r_5 = -12.945$
$\quad d_5 = 0.62$
$r_6 = \infty$ (stop)
$\quad d_6 = D_1$ (variable)
$r_7 = -56.016$ (aspherical surface)
$\quad d_7 = 2.46 \quad n_4 = 1.52542 \quad \nu_4 = 55.78$
$r_8 = -48.938$
$\quad d_8 = 6.96$
$r_9 = -9.995$
$\quad d_9 = 1.92 \quad n_5 = 1.52542 \quad \nu_5 = 55.78$
$r_{10} = -39.286$
aspherical surface coefficients (2nd surface) $\quad K = 14.976,$
$\quad A_4 = 6.36154 \times 10^{-5}, A_6 = -3.23522 \times 10^{-7},$
$\quad A_8 = 3.00462 \times 10^{-8}, A_{10} = -3.06289 \times 10^{-10}$
(7th surface) $\quad K = 42.031,$
$\quad A_4 = 9.08647 \times 10^{-5}, A_6 = 1.20246 \times 10^{-7},$
$\quad A_8 = 1.76842 \times 10^{-8}, A_{10} = -1.21194 \times 10^{-10}$

| f | 39.188 | 56.886 | 73.621 |
|---|---|---|---|
| $D_1$ | 10.49 | 4.68 | 1.75 |

$f_1/f_w = 0.692, f_2/f_w = -0.690, d_4/f_w = 0.310,$
$|f_s/f_w| = 25.445(\text{1st lens unit}),$
$|f_s/f_w| = 16.794(\text{2nd lens unit}), |f_s(1)/f_1| = 36.791,$
$|f_s(2)/f_2| = 24.344, d_4/f_1 = 0.499$ Embodiment 2
f = 39.199~56.941~73.619, F number = 4.66~6.77~8.75

$r_1 = 30.546$
$\quad d_1 = 1.60 \quad n_1 = 1.49241 \quad \nu_1 = 57.66$
$r_2 = 32.022$ (aspherical surface)
$\quad d_2 = 1.37$
$r_3 = 293.857$
$\quad d_3 = 1.09 \quad n_2 = 1.58144 \quad \nu_2 = 40.75$
$r_4 = 9.742$
$\quad d_4 = 12.14 \quad n_3 = 1.51823 \quad \nu_3 = 58.90$
$r_5 = -12.946$
$\quad d_5 = 0.61$
$r_6 = \infty$ (stop)
$\quad d_6 = D_1$ (variable)
$r_7 = -53.632$ (aspherical surface)

-continued

Embodiment 2
f = 39.199~56.941~73.619, F number = 4.66~6.77~8.75

$\quad d_7 = 2.40 \quad n_4 = 1.49241 \quad \nu_4 = 57.66$
$r_8 = -47.031$
$\quad d_8 = 6.97$
$r_9 = -10.000$
$\quad d_9 = 1.91 \quad n_5 = 1.52542 \quad \nu_5 = 55.78$
$r_{10} = -39.042$
aspherical surface coefficients (2nd surface) $\quad K = 15.254,$
$\quad A_4 = 6.05242 \times 10^{-5}, A_6 = -4.37391 \times 10^{-7},$
$\quad A_8 = 3.29439 \times 10^{-8}, A_{10} = -3.79858 \times 10^{-10}$
(7th surface) $\quad K = 41.974,$
$\quad A_4 = 9.80863 \times 10^{-5}, A_6 = 2.43358 \times 10^{-7},$
$\quad A_8 = 1.56958 \times 10^{-8}, A_{10} = -6.23347 \times 10^{-10}$

| f | 39.199 | 56.941 | 73.619 |
|---|---|---|---|
| $D_1$ | 10.50 | 4.67 | 1.75 |

$f_1/f_w = 0.692, f_2/f_w = -0.690, d_4/f_w = 0.310,$
$|f_s/f_w| = 25.292(\text{1st lens unit}),$
$|f_s/f_w| = 17.679(\text{2nd lens unit}), |f_s(1)/f_1| = 36.572,$
$|f_s(2)/f_2| = 25.615, d_4/f_1 = 0.448$ Embodiment 3
f = 38.894~57.790~73.607, F number = 4.66~6.92~8.82

$r_1 = 28.743$
$\quad d_1 = 2.10 \quad n_1 = 1.49241 \quad \nu_1 = 57.66$
$r_2 = 34.714$ (aspherical surface)
$\quad d_2 = 1.56$
$r_3 = 330.314$
$\quad d_3 = 1.32 \quad n_2 = 1.60342 \quad \nu_2 = 38.03$
$r_4 = 8.291$
$\quad d_4 = 11.90 \quad n_3 = 1.51742 \quad \nu_3 = 52.43$
$r_5 = -12.343$
$\quad d_5 = 0.63$
$r_6 = \infty$ (stop)
$\quad d_6 = D_1$ (variable)
$r_7 = -42.678$ (aspherical surface)
$\quad d_7 = 2.02 \quad n_4 = 1.49241 \quad \nu_4 = 57.66$
$r_8 = -34.045$
$\quad d_8 = 6.67$
$r_9 = -10.065$
$\quad d_9 = 1.52 \quad n_5 = 1.52542 \quad \nu_5 = 55.78$
$r_{10} = -50.103$
aspherical surface coefficients (2nd surface) $\quad K = 14.925,$
$\quad A_4 = 6.94771 \times 10^{-5}, A_6 = -8.30869 \times 10^{-9},$
$\quad A_8 = 2.25167 \times 10^{-8}, A_{10} = -1.19791 \times 10^{-10}$
(7th surface) $\quad K = 27.478,$
$\quad A_4 = 1.11705 \times 10^{-4}, A_6 = 2.07922 \times 10^{-7},$
$\quad A_8 = 2.09262 \times 10^{-8}, A_{10} = -6.64371 \times 10^{-11}$

| f | 38.894 | 57.790 | 73.607 |
|---|---|---|---|
| $D_1$ | 10.45 | 4.47 | 1.83 |

$f_1/f_w = 0.691, f_2/f_w = -0.680, d_4/f_w = 0.306,$
$|f_s/f_w| = 7.819(\text{1st lens unit}),$
$|f_s/f_w| = 8.159(\text{2nd lens unit}), |f_s(1)/f_1| = 11.309,$
$|f_s(2)/f_2| = 12.005, d_4/f_1 = 0.443$ Embodiment 4
f = 39.028~56.027~77.345, F number = 4.66~6.69~9.23

$r_1 = 35.560$
$\quad d_1 = 1.17 \quad n_1 = 1.49241 \quad \nu_1 = 57.66$
$r_2 = 37.870$ (aspherical surface)

-continued

Embodiment 4
f = 39.028~56.027~77.345, F number = 4.66~6.69~9.23

|  |  |  |  |
|---|---|---|---|
| | $d_2 = 1.82$ | | |
| $r_3 = \infty$ | | | |
| | $d_3 = 1.31$ | $n_2 = 1.58144$ | $\nu_2 = 40.75$ |
| $r_4 = 10.474$ | | | |
| | $d_4 = 9.31$ | $n_3 = 1.51823$ | $\nu_3 = 58.90$ |
| $r_5 = -11.804$ | | | |
| | $d_5 = 0.25$ | | |
| $r_6 = \infty$ (stop) | | | |
| | $d_6 = D_1$ (variable) | | |
| $r_7 = -48.683$ (aspherical surface) | | | |
| | $d_7 = 3.29$ | $n_4 = 1.52542$ | $\nu_4 = 55.78$ |
| $r_8 = -41.739$ | | | |
| | $d_8 = 6.03$ | | |
| $r_9 = -9.645$ | | | |
| | $d_9 = 2.43$ | $n_5 = 1.52542$ | $\nu_5 = 55.78$ |
| $r_{10} = -45.255$ | | | | aspherical surface coefficients (2nd surface)   K = 27.068,
    $A_4 = 8.42634 \times 10^{-5}$, $A_6 = 4.83586 \times 10^{-7}$,
    $A_8 = 2.54590 \times 10^{-8}$, $A_{10} = -3.41740 \times 10^{-10}$
(7th surface)   K = 29.223,
    $A_4 = 9.81398 \times 10^{-5}$, $A_6 = 4.45386 \times 10^{-8}$,
    $A_8 = 3.94165 \times 10^{-8}$, $A_{10} = -5.22984 \times 10^{-10}$

| f | 39.028 | 56.027 | 77.345 |
|---|---|---|---|
| $D_1$ | 9.36 | 4.49 | 1.41 |

$f_1/f_w = 0.646$, $f_2/f_w = -0.637$, $d_4/f_w = 0.239$,
$|f_s/f_w| = 25.996$(1st lens unit),
$|f_s/f_w| = 12.269$(2nd lens unit), $|f_s(1)/f_1| = 40.261$,
$|f_s(2)/f_2| = 19.275$, $d_4/f_1 = 0.369$

Embodiment 5
f = 38.283~57.245~77.789, F number = 4.66~6.97~9.46

|  |  |  |  |
|---|---|---|---|
| $r_1 = 41.174$ | | | |
| | $d_1 = 1.12$ | $n_1 = 1.49241$ | $\nu_1 = 57.66$ |
| $r_2 = 48.767$ (aspherical surface) | | | |
| | $d_2 = 1.36$ | | |
| $r_3 = -113.092$ | | | |
| | $d_3 = 1.18$ | $n_2 = 1.56732$ | $\nu_2 = 42.83$ |
| $r_4 = 9.101$ | | | |
| | $d_4 = 12.02$ | $n_3 = 1.51823$ | $\nu_3 = 58.90$ |
| $r_5 = -13.049$ | | | |
| | $d_5 = 0.90$ | | |
| $r_6 = \infty$ (stop) | | | |
| | $d_6 = D_1$ (variable) | | |
| $r_7 = -150.666$ (aspherical surface) | | | |
| | $d_7 = 2.52$ | $n_4 = 1.52542$ | $\nu_4 = 55.78$ |
| $r_8 = -119.883$ | | | |
| | $d_8 = 9.52$ | | |
| $r_9 = -13.098$ | | | |
| | $d_9 = 1.44$ | $n_5 = 1.52542$ | $\nu_5 = 55.78$ |
| $r_{10} = -98.041$ | | | | aspherical surface coefficients (2nd surface)   K = 31.513,
    $A_4 = 7.65671 \times 10^{-5}$, $A_6 = 1.02719 \times 10^{-7}$,
    $A_8 = 1.93022 \times 10^{-8}$, $A_{10} = -1.25252 \times 10^{-10}$
(7th surface)   K = -188.751,
    $A_4 = 1.96376 \times 10^{-5}$, $A_6 = -1.05546 \times 10^{-7}$,
    $A_8 = 6.22736 \times 10^{-9}$, $A_{10} = -5.17359 \times 10^{-11}$

| f | 38.283 | 57.245 | 77.789 |
|---|---|---|---|
| $D_1$ | 12.81 | 5.13 | 1.04 |

$f_1/f_w = 0.777$, $f_2/f_w = -0.779$, $d_4/f_w = 0.314$,
$|f_s/f_w| = 13.376$(1st lens unit),
$|f_s/f_w| = 28.370$(2nd lens unit), $|f_s(1)/f_1| = 17.215$,
$|f_s(2)/f_2| = 36.240$, $d_4/f_1 = 0.404$

Embodiment 6
f = 39.197~58.084~77.831, F number = 4.66~6.90~9.25

|  |  |  |  |
|---|---|---|---|
| $r_1 = 32.475$ | | | |
| | $d_1 = 1.15$ | $n_1 = 1.49241$ | $\nu_1 = 57.66$ |
| $r_2 = 34.278$ (aspherical surface) | | | |
| | $d_2 = 1.09$ | | |
| $r_3 = 110.765$ | | | |
| | $d_3 = 1.17$ | $n_2 = 1.58144$ | $\nu_2 = 40.75$ |
| $r_4 = 9.728$ | | | |
| | $d_4 = 14.24$ | $n_3 = 1.51823$ | $\nu_3 = 58.90$ |
| $r_5 = -13.919$ | | | |
| | $d_5 = 0.66$ | | |
| $r_6 = \infty$ (stop) | | | |
| | $d_6 = D_1$ (variable) | | |
| $r_7 = -92.368$ (aspherical surface) | | | |
| | $d_7 = 2.01$ | $n_4 = 1.52542$ | $\nu_4 = 55.78$ |
| $r_8 = -72.934$ | | | |
| | $d_8 = 6.85$ | | |
| $r_9 = -9.779$ | | | |
| | $d_9 = 1.95$ | $n_5 = 1.52542$ | $\nu_5 = 55.78$ |
| $r_{10} = -38.676$ | | | | aspherical surface coefficients (2nd surface)   K = 11.197,
    $A_4 = 6.00270 \times 10^{-5}$, $A_6 = -3.05236 \times 10^{-7}$,
    $A_8 = 2.07453 \times 10^{-8}$, $A_{10} = -1.43124 \times 10^{-10}$
(7th surface)   K = 48.884,
    $A_4 = 6.98327 \times 10^{-5}$, $A_6 = 9.28357 \times 10^{-8}$,
    $A_8 = 1.12336 \times 10^{-8}$, $A_{10} = -1.16429 \times 10^{-10}$

| f | 39.197 | 58.084 | 77.831 |
|---|---|---|---|
| $D_1$ | 10.63 | 4.57 | 1.37 |

$f_1/f_w = 0.700$, $f_2/f_w = -0.680$, $d_4/f_w = 0.363$,
$|f_s/f_w| = 26.442$(1st lens unit),
$|f_s/f_w| = 16.253$(2nd lens unit), $|f_s(1)/f_1| = 37.762$,
$|f_s(2)/f_2| = 23.915$, $d_4/f_1 = 0.519$

Embodiment 7
f = 39.199~58.210~79.774, F number = 4.66~6.92~9.48

|  |  |  |  |
|---|---|---|---|
| $r_1 = 31.947$ | | | |
| | $d_1 = 1.27$ | $n_1 = 1.49241$ | $\nu_1 = 57.66$ |
| $r_2 = 33.707$ (aspherical surface) | | | |
| | $d_2 = 1.29$ | | |
| $r_3 = 409.141$ | | | |
| | $d_3 = 1.18$ | $n_2 = 1.58144$ | $\nu_2 = 40.75$ |
| $r_4 = 10.281$ | | | |
| | $d_4 = 11.97$ | $n_3 = 1.51823$ | $\nu_3 = 58.90$ |
| $r_5 = -12.888$ | | | |
| | $d_5 = 0.66$ | | |
| $r_6 = \infty$ (stop) | | | |
| | $d_6 = D_1$ (variable) | | |
| $r_7 = -58.864$ (aspherical surface) | | | |
| | $d_7 = 2.19$ | $n_4 = 1.52542$ | $\nu_4 = 55.78$ |
| $r_8 = -48.058$ | | | |
| | $d_8 = 6.83$ | | |
| $r_9 = -9.816$ | | | |
| | $d_9 = 2.02$ | $n_5 = 1.52542$ | $\nu_5 = 55.78$ |
| $r_{10} = -42.163$ | | | | aspherical surface coefficients (2nd surface)   K = 14.230,
    $A_4 = 7.46113 \times 10^{-5}$, $A_6 = -1.66325 \times 10^{-8}$,
    $A_8 = 2.53796 \times 10^{-8}$, $A_{10} = -1.67279 \times 10^{-10}$
(7th surface)   K = 49.185,
    $A_4 = 9.28059 \times 10^{-5}$, $A_6 = 3.32555 \times 10^{-7}$,
    $A_8 = 1.17637 \times 10^{-8}$, $A_{10} = -4.13144 \times 10^{-11}$

| f | 39.199 | 58.210 | 79.774 |
|---|---|---|---|
| $D_1$ | 10.67 | 4.76 | 1.46 |

$f_1/f_w = 0.688$, $f_2/f_w = -0.671$, $d_4/f_w = 0.305$,

-continued

Embodiment 7
f = 39.199~58.210~79.774, F number = 4.66~6.92~9.48

|f$_s$/f$_w$| = 25.597(1st lens unit),
|f$_s$/f$_w$| = 11.882(2nd lens unit), |f$_s$(1)/f$_1$| = 37.191,
|f$_s$(2)/f$_2$| = 17.965, d$_4$/f$_1$ = 0.444 wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements for the d-line, and the reference symbols $\upsilon_1, \upsilon_2 \ldots$ represent Abbe's number of the respective lens elements. Furthermore, lengths such as focal lengths are specified in millimeters.

The first through seventh embodiments are lens systems which have compositions shown in FIGS. 1 through 7 respectively, and each of which comprises, in order from the object side, a first lens unit having a positive refractive power and a second lens unit having a negative refractive power, and is configured to change a magnification from a wide position to a tele position by moving the first lens unit and the second lens unit while shortening an airspace reserved between these lens units.

Out of these embodiments, the first embodiment is a zoom lens system comprising a first lens unit which consists of a plastic lens element having a weak refractive power and a cemented lens component consisting of a negative glass lens element and a positive glass lens element, and a second lens unit which consists of a plastic lens element having a weak refractive power and a negative plastic lens element. The negative glass lens element used in the first lens unit has a meniscus shape. Furthermore, the plastic lens element used in the first lens unit is made of a polymethyl methacrylate acrylic resin material (PMMA), whereas both the plastic lens element having the weak refractive power which is disposed on the object side and the negative plastic lens element disposed on the image side in the second lens unit are made of a polyolefin resin.

Each of the second and third embodiments is different from the first embodiment in that it uses a negative glass lens element which has a meniscus shape in a fist lens unit and a plastic lens element having a weak refractive power which is made of a polymethyl methacrylate resin (PMMA) in a second lens unit.

The fourth embodiment is the same as the first embodiment, except a first lens unit which uses a negative glass lens element configured as a plano-concave lens element.

The fifth embodiment has a composition which is the same as that of the first embodiment wherein the first lens unit uses the negative glass lens element configured as a biconcave lens element.

Each of the sixth and seventh embodiment has a composition which is the same as that of the first embodiment.

In each of the embodiments described above, the plastic lens element having the weak refractive power which is disposed in the first lens unit has a convex object side surface and an aspherical image side surface, and the plastic lens element having a weak refractive power which is disposed in the second lens unit also has an aspherical surface on the object side. Furthermore, an aperture stop is disposed after the first lens unit, or on the image side of the positive glass lens element of the cemented lens component which composes the first lens unit.

The aspherical surfaces used in the embodiments described above have shapes which are expressed by the following formula:

$$x=(y^2/r) / [1 +\{1 -(1+k)(y/r)^2\}^{1/2}]+A_4y^4+A_6y^6+A_8y^8+A_{10}y^{10}$$

wherein a direction along the optical axis is taken as x, a direction perpendicular to the optical axis is taken as y, the reference symbol r represents a radius of curvature in the vicinity of the optical axis, the reference symbol k designates a conical coefficient, and the reference symbols $A_4$, $A_6$, $A_8$ and $A_{10}$ denote aspherical surface coefficients.

Though the embodiments of the present invention described above are configured as the zoom lens systems, the present invention is applicable not only to zoom lens systems but also compact image pickup lens systems. By configuring all independent lens elements as plastic lens elements and using cemented lens components consisting of glass lens elements, it is possible to obtain a compact and light-weight image pickup lens system having favorable optical performance which is varied extremely little due to changes of environmental conditions even when the plastic lens elements are used in a relatively large number.

Figure 9:
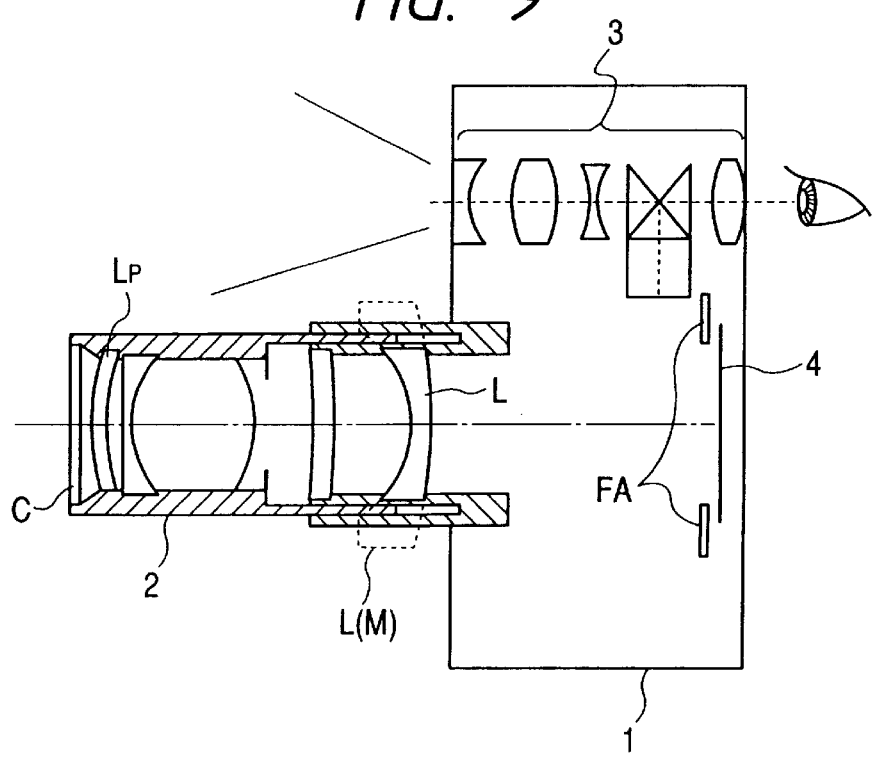
FIG. 9 is a diagram showing an outline of a camera which is equipped with the image pickup lens system according to the present invention.

FIG. 9 shows a camera which is equipped with the image pickup lens system described as the first embodiment. A camera 1 is the so-called lens shutter camera equipped with a finder optical system 3 which leads an external image to an observer's eye separately from an image pickup lens system 2.

Furthermore, a photographing film 4 is disposed in the vicinity of an image surface of the image pickup lens system 2, and a rectangular field stop FA which is shown in FIG. 8 and functions to determine a photographing range is disposed immediately before the film 4. In FIG. 9, a vertical direction on the paper surface corresponds to a short side and a direction perpendicular to the paper surface corresponds to a long side.

Furthermore, a lens element L which is disposed on the image side of the second lens unit of the image pickup lens system shown in FIG. 9 is a plastic lens element, and upper and lower ineffective surfaces of the lens element L are cut off so that the lens element has an oval shape, or surfaces L(M) traced in dashed lines in FIG. 9 are cut off so that the lens element has an oval shape, whereby the image pickup lens system is compact and light in weight.

The lens element L which has the oval shape makes it possible to configure a camera compact while preventing the image pickup lens system and a lens barrel from interfering with other components such as the viewfinder optical system at when the image pickup lens system and the lens barrel are to be accommodated into the camera at a stage to terminate photographing and when an image is to be photographed at a wide field angle.

Furthermore, disposed before the first lens unit is a cover glass plate C to protect a plastic lens element Lp which is arranged on the object side in the first lens unit.

Though the camera shown in FIG. 9 is equipped with the image pickup lens system described as the first embodiment, it is possible to obtain a camera which has a composition similar to that shown in FIG. 9 using the image pickup lens system described as any one of the other embodiments. Furthermore, a similar camera may be composed using an image pickup lens system which is not a zoom lens system but has a fixed focal point.

Imaging performance of the image pickup lens system according to the present invention is variable extremely little due to variation of humidity and temperature though it can be manufactured compact and light in a weight thereof at a low cost with plastic lens elements. Furthermore, a camera which is equipped with the image pickup lens system according to the present invention can be configured extremely compact.

What is claimed is:

1. An image pickup lens system comprising in order from the object side: a first lens unit having a positive refractive power; and a second lens unit having a negative refractive power, wherein said lens system is configured to change a magnification by varying an airspace reserved between said first lens unit and said second lens unit, wherein said first lens unit comprises, in order from the object side, a plastic lens element having a weak refractive power, a glass lens element having a negative refractive power and a glass lens element having a positive refractive power, and wherein said second lens unit comprises, in order from the object side, a plastic lens element having a weak refractive power and a plastic lens element having a negative refractive power and wherein the distances between each of the lens elements in the first lens unit and each of the lens elements in the second lens unit are constant during the change in magnification.

2. The image pickup lens system according to claim 1, wherein each of said plastic lens element having the weak refractive power in the first lens unit and the plastic lens element having the weak refractive power in said second lens unit satisfies the following condition (4):

$$|f_s/f_w| > 5 \tag{4}$$

wherein the reference symbol $f_s$ represents a focal length of the plastic lens element having the weak refractive power in the first lens unit or the second lens unit and the reference symbol $f_w$ designates a focal length of said lens system as a whole at its wide position.

3. The image pickup lens system according to claim 1, wherein each of the plastic lens element having the weak refractive power in said first lens unit and the plastic lens element having the weak refractive power in said second lens unit satisfies the following condition (4—1):

$$|f_s/f_w| > 12.5 \tag{4—1}$$

wherein the reference symbol $f_s$ represents a focal length of the plastic lens element having the weak refractive power in the first lens unit or the second lens unit and the reference symbol $f_w$ designates a focal length of said lens system as a whole at its wide position.

4. The image pickup lens system according to claim 1, wherein the plastic lens element having the weak refractive power in said first lens unit satisfies the following condition (5):

$$|f_s(1)/f_1| > 6.5 \tag{5}$$

wherein the reference symbol $f_s(1)$ represents a focal length of the plastic lens element having the weak refractive power in said first lens unit and the reference symbol $f_1$ designates a focal length of said first lens unit.

5. The image pickup lens system according to claim 1, wherein the plastic lens element having the weak refractive power in said first lens unit satisfies the following condition (5—1):

$$|f_s(1)/f_1| > 16.5 \tag{5—1}$$

wherein the reference symbol $f_s(1)$ represents a focal length of the plastic lens element having the weak refractive power in said first lens unit and the reference symbol $f_1$ designates a focal length of said first lens unit.

6. The image pickup lens system according to claim 1, wherein the plastic lens element having the weak refractive power in said first lens unit satisfies the following condition (5—2):

$$|f_s(1)/f_1| > 22.5 \tag{5—2}$$

wherein the reference symbol $f_s(1)$ represents a focal length of the plastic lens element having the weak refractive power in said first lens unit and the reference symbol $f_1$ designates a focal length of said first lens unit.

7. The image pickup lens system according to claim 1, wherein the plastic lens element having the weak refractive power in said second lens unit satisfies the following condition (6):

$$|f_s(2)/f_2| > 6.5 \tag{6}$$

wherein the reference symbol $f_s(2)$ represents a focal length of the plastic lens element having the weak refractive power in said second lens unit and the reference symbol $f_2$ designates a focal length of said second lens unit.

8. The image pickup lens system according to claim 1, wherein the plastic lens element having the weak refractive power in said second lens unit satisfies the following condition (6—1):

$$|f_s(2)/f_2| > 16.5 \tag{6—1}$$

wherein the reference symbol $f_s(2)$ represents a focal length of the plastic lens element having the weak refractive power in said second lens unit and the reference symbol $f_2$ designates a focal length of said second lens unit.

9. The image pickup lens system according to claim 1, wherein the plastic lens element having the weak refractive power in said second lens unit satisfies the following condition (6—2):

$$|f_s(2)/f_2| > 22.5 \tag{6—2}$$

wherein the reference symbol $f_s(2)$ represents a focal length of the plastic lens element having the weak refractive power in said second lens unit and the reference symbol $f_2$ designates a focal length of said second lens unit.

10. The image pickup lens system according to claim 1, wherein the glass lens element having the negative refractive power in said first lens unit has a radius of curvature on an image side surface thereof which is smaller in absolute value than that on an object side surface thereof.

11. The image pickup lens system according to claim 1, wherein said plastic lens element having the weak refractive power in said first lens unit has a convex surface on the object side and an aspherical surface.

12. The image pickup lens system according to claim 11, wherein said plastic lens element having the weak refractive power in said first lens unit has a positive refractive power and said aspherical surface has a shape which weakens said positive refractive power as portions of said aspherical surface are farther from an optical axis.

13. The image pickup lens system according to claim 1, wherein the glass lens element having the negative refractive power and the glass lens element having the positive refractive power in said first lens unit are cemented to each other to compose a cemented lens component.

14. The image pickup lens system according to claim 1, wherein a stop is disposed on the image side of the glass lens element having the positive refractive power in said first lens unit.

15. The image pickup lens system according to claim 1, wherein the plastic lens element having the negative refractive power in said second lens unit is made of a polyolefin resin.

16. The image pickup lens system according to claim 1, wherein a cover glass plate is disposed on the object side of said first lens unit.

17. The image pickup lens system according to claim 1 comprising: means of define directions along a long side and a short side of an image surface to determine a photographing range in the vicinity of an image formed by said image pickup lens system, wherein at least one of the plastic lens elements in said second lens unit is configured so as to have a side in the direction along the long side of the image surface which is longer than a side in the direction along the short side of the image surface.

18. The image pickup lens system according to claim 1 satisfying the following condition (1):

$$0.5 < f_1/f_w < 0.9 \quad (1)$$

wherein the reference symbol $f_1$ represents a focal length of said first lens unit and the reference symbol $f_w$ designates a focal length of the lens system as a whole at its wide position.

19. The image pickup lens system according to claim 1 satisfying the following condition (1—1):

$$0.65 < f_1/f_w < 0.75 \quad (1\text{—}1)$$

wherein the reference symbol $f_1$ represents a focal length of said first lens unit and the reference symbol $f_w$ designates a focal length of the lens system as a whole at its wide position.

20. The image pickup lens system according to claim 1 satisfying the following condition (2):

$$-0.9 < f_2/f_w < -0.5 \quad (2)$$

wherein the reference symbol $f_2$ represents a focal length of said second lens unit and the reference symbol $f_w$ designates a focal length of said lens system as a whole at its wide position.

21. The image pickup lens system according to claim 1 satisfying the following condition (2—1):

$$-0.75 < f_2/f_w < -0.65 \quad (2\text{—}1)$$

wherein the reference symbol $f_2$ represents a focal length of said second lens unit and the reference symbol $f_w$ designates a focal length of said lens system as a whole at its wide position.

22. The image pickup lens system according to claim 1 satisfying the following condition (3):

$$0.15 < d_4/f_w < 0.45 \quad (3)$$

wherein the reference symbol $d_4$ represents thickness of the positive glass lens element in said first lens unit and the reference symbol $f_w$ designates a focal length of said lens system as a whole at its wide position.

23. The image pickup lens system according to claim 1 satisfying the following condition (3—1):

$$0.25 < d_4/f_w < 0.35 \quad (3\text{—}1)$$

wherein the reference symbol $d_4$ represents thickness of the positive glass lens element in said first lens unit and the reference symbol $f_w$ designates a focal length of said lens system as a whole at its wide position.

24. The image pickup lens system according to claim 1 wherein a glass lens element of said first lens unit has a positive refractive power and satisfying the following condition (7):

$$0.21 < d_4/f_1 < 0.63 \quad (7)$$

wherein the reference symbol $d_4$ represents thickness of the positive glass lens element in said first lens unit and the reference symbol $f_1$ designates a focal length of said first lens unit.

25. The image pickup lens system according to claim 1 wherein a glass lens element of said first lens unit has a positive refractive power and satisfying the following condition (7—1):

$$0.38 < d_4/f_1 < 0.50 \quad (7\text{—}1)$$

wherein the reference symbol $d_4$ represents thickness of the positive glass lens element in said first lens unit and the reference symbol $f_1$ designates a focal length of said first lens unit.

26. An image pickup lens system comprising in order from the object side: a first lens unit having a positive refractive power; and a second lens unit having a negative refractive power, wherein said lens system is configured to change a magnification by varying an airspace reserved between said first lens unit and said second lens unit, wherein said first lens unit consists of a plastic lens element and a cemented lens component consisting of two glass lens elements, and wherein said second lens unit consists of two plastic lens elements.

27. A camera equipped with the image pickup lens system as claimed in any one of claims 1 and 26.

28. The camera according to claim 27 equipped separately from said image pickup lens system with a viewfinder optical system which permits observing outside.

* * * * *